United States Patent [19]

Hata et al.

[11] Patent Number: 4,571,357
[45] Date of Patent: Feb. 18, 1986

[54] ELECTRICALLY INSULATING LAMINATE PAPER FOR OIL-IMPREGNATED ELECTRIC APPARATUS

[75] Inventors: Ryosuke Hata; Shosuke Yamanouchi; Masayuki Hirose, all of Osaka; Hidemitsu Kuwabara, Shizuoka; Hiroyuki Yamamoto, Shizuoka; Yasuharu Mizumoto, Shizuoka, all of Japan

[73] Assignee: Sumitomo Electric Industries, Ltd., Tokyo, Japan

[21] Appl. No.: 465,715

[22] Filed: Feb. 11, 1983

[51] Int. Cl.$^4$ .............................................. D06N 7/04
[52] U.S. Cl. ..................................... 428/153; 428/511; 428/537.5; 428/409; 428/311.1; 174/25 R; 174/110 PM; 174/120 SR; 174/120 FP; 156/83; 427/444

[58] Field of Search ....................... 428/511, 537, 153; 174/25 R, 110 PM, 120 FP, 120 SR; 156/83; 427/444

[56] References Cited

U.S. PATENT DOCUMENTS 3,775,549  11/1973  Matsuda et al. ................... 428/511

Primary Examiner—Edith Buffalow
Attorney, Agent, or Firm—Sughrue, Mion, Zinn, Macpeak & Seas

[57] ABSTRACT

An electrically insulating laminate paper for an electric apparatus to be wound in a wet state on a conductive material and thereafter impregnated with oil, which is characterized by that water drops having a wide particle size distribution are scattered on the surface of the electrically insulating laminate paper comprising an integrated assembly composed of a plastic film and fiber papers bonded to each other to moisten said fiber papers.

2 Claims, 3 Drawing Figures

ELECTRICALLY INSULATING LAMINATE PAPER FOR OIL-IMPREGNATED ELECTRIC APPARATUS

FIELD OF THE INVENTION

The present invention relates to a compound material for oil-impregnated electric apparatus comprising an integrated assembly composed of a plastic film and fiber papers, wherein the whole of cellulose fiber papers has fine unevenness which is applied by utilizing a hygroscopic property of the fiber papers when forming an electrically insulating paper by compounding a plastic film and fiber papers having a hygroscopic property such as natural cellulose.

BACKGROUND OF THE INVENTION

Recently, with advancement of making electric cables requiring an extra-high voltage and a large capacity, it has been desired to miniaturize the cables and to reduce dielectric loss for the purpose of reducing the cost of construction and the cost of operation. As a means for attaining these requirements, there have been improvements with respect to the insulating materials used. It has become necessary to use materials which not only have excellent electric properties such as dielectric breakdown strength to impulse voltage and to AC voltage or dielectric loss tangent, etc. but also excellent mechanical strength. To meet these requirements attempts have been made to utilize a plastic film instead of the previously used oil-impregnated paper composed of a natural cellulose paper and an insulating oil. However, this material has been found to be undesirable due to temperature dependent characteristics inherent in plastics, large polar effects on impulse voltage, deterioration of a withstand voltage to repeated application of voltage, difficulty of following a variation of excess oil pressure caused by inferior stream of oil between film layers, and other defects. In order to compensate for these faults so as to give a barrier effect for the impulse voltage and to keep the stream of oil between insulating layers, a compounding technique has been developed wherein a plastic film and cellulose fiber papers are united. Plastic films used for such a technique, must have excellent properties with respect to impulse voltage characteristic, AC voltage characteristic and dielectric characteristics, etc. Giving consideration to these factors polyolefin films have been found to be suitable. However, compound materials composed of polyolefin films and insulating papers become thicker when impregnated with oil as compared with only using the insulating paper because of swelling caused by the oil used (mineral oil, DDB, and hydrocarbon oils such as alkyl-naphthalenes, etc.), resulting in that the insulating paper present between films is pressed against the films which increases the unevenness of the surface or increases the resistance of oil streaming through the fibers. Consequently, the streaming of oil in the radial direction of the cable causes damage to the mechanical characteristics of insulating materials which are required for bending the cable or deteriorates other characteristics. In order to restrain the increase in thickness due to the swelling of the polyolefin films as much as possible, it is preferred to use polyolefin films which cause less variation in thickness. However, it is not possible to avoid an increase in thickness under existing circumstances due to physical limitations.

Even though essential restriction of swelling is impossible, it is possible to restrain an apparent increase in thickness caused by swelling. Techniques to accomplish this have been recently developed. One such technique comprises previously moistening insulating papers in the insulating material composed of a plastic film and insulating papers by utilizing a hygroscopic swelling property of the insulating papers to increase the thickness, winding the insulating material on a cable conductor, drying it to reduce the thickness of the insulating paper between plastic films, and impregnating the insulating papers wth oil. This technique is described in Japanese Patent Publication No. 38237/77. Thus, the increase in thickness of the plastic film by swelling can be compensated by the latitude of the insulating papers having a reduced thickness and, consequently, streaming of insulating oil is not prevented, even if the film is in a swollen state after being impregnated with insulating oil.

Another method comprises compulsorily forming prescribed unevenness on a compound material composed of a plastic film and fiber paper, namely, embossing, by which the increase in thickness caused by swelling of the plastic film after being impregnated with insulating oil is absorbed by deformation of the unevenness. However, in this method, there is a possibility of deterioration of mechanical and electric strengths, because the compound material composed of a plastic film and fiber papers is easily damaged locally during the mechanical embossment processing.

SUMMARY OF THE INVENTION

A primary object of the present invention is to provide an electrically insulating paper laminate comprising an integrated assembly composed of a plastic film and fiber papers bonded to each other, wherein an increase in thickness of the plastic film by swelling after being impregnated with insulating oil can be effectively prevented by utilizing a hygroscopic swelling characteristic of said fiber papers.

The present inventors have conducted various studies with respect to the influence of the laminate paper comprising an integrated assembly composed of a plastic film and fiber papers bonded to each other on preventing an increase in thickness of the plastic film due to swelling in insulating oils. As a result, it has been found that the effect is different depending upon the way of applying water even if the amount of water is the same. More specifically, the effect of preventing the increase in thickness of the plastic film becomes remarkable when the fiber paper is heterogeneously moistened by scattering water drops having a wide particle size distribution as compared with when it is uniformly moistened by scattering fine water drops having a narrow particle size distribution or by equilibrating water in the fiber papers with steam in the air having a high relative humidity.

The present invention relates to an electrically insulating laminate paper for an electric apparatus to be wound in a wet state on a conductive material and thereafter dried and impregnated with oil, which is characterized by that water drops having a wide particle size distribution are scattered on the surface of the electrically insulating laminate paper comprising an integrated assembly composed of a plastic film and fiber papers bonded to each other to moisten said fiber papers.

BRIEF DESCRIPTION OF THE DRAWINGS

Each of the figures are actual size photographs of the surface of the electrically insulating laminate paper, wherein.

DETAILED DESCRIPTION OF THE INVENTION

Figure 1:
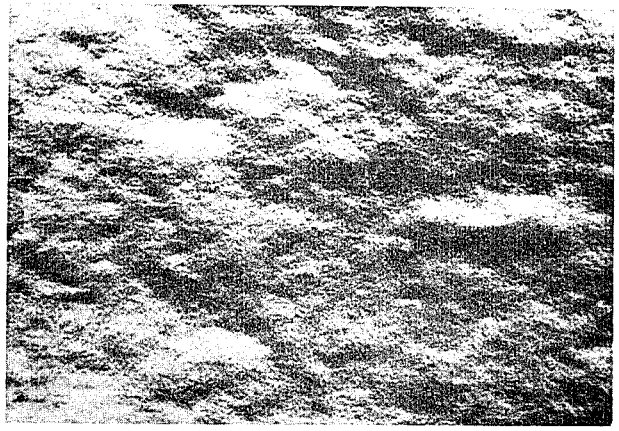
FIG. 1 is a photograph of the surface of the electrically insulating laminate paper according to the present invention.

FIG. 1 is an actual size photograph of the surface of kraft paper in the same polypropylene laminate paper as that used in Example 1, wherein water drops having various sizes formed by hitting water jetting from a nozzle against a wire netting are scattered on the surface of the kraft paper placed on both sides of the polypropylene layer (water content of the paper after scattering is 11.2%) and thereafter dried at 100° C. for 1 hour. The surface of the kraft paper is pockmarked all over to form irregular unevenness. The degree of unevenness sometimes reaches about 10 to 20 mm which is by far larger than the particle size of water drops (20 to 500 μm) to be applied.

Figure 2:
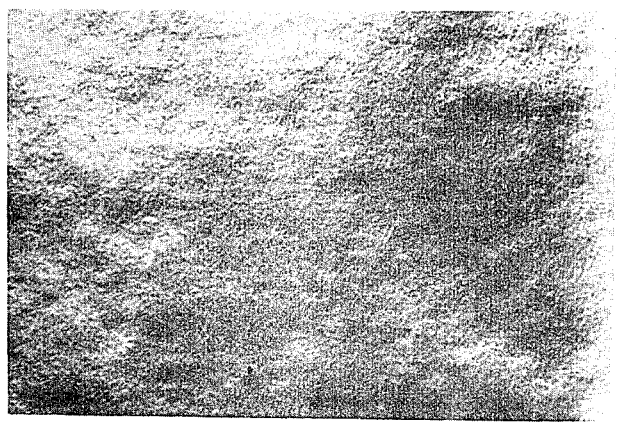
FIG. 2 is a photograph of the surface of the electrically insulating laminate paper after being allowed to stand in a conditioning box at a relative humidity of 90%.

FIG. 2 is an actual size photograph of the surface of kraft paper in the same laminate paper as in FIG. 1, after the paper was allowed to stand for 4 hours in a conditioning box at a relative humidity of 90% so as to equilibrate the water in the kraft paper with steam in the air (water content of the paper after being allowed to come to equilibrium is 10.5%) and thereafter dried at 100° C. for 1 hour. The appearance of the surface is quite different from FIG. 1, which is smooth all over or unevenness with long span is small even though unevenness with short span or roughness can be observed.

Figure 3:
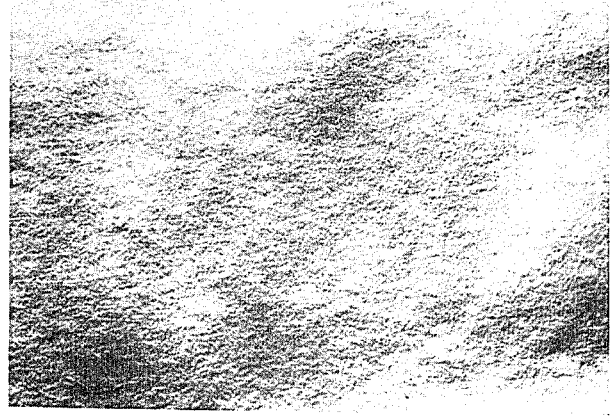
FIG. 3 is a photograph of the surface of unprocessed electrically insulating laminate paper.

FIG. 3 is an actual size photograph of the surface of kraft paper in the polypropylene laminate paper (water content: 5.4%) which is not subjected to wetting treatment, namely, not moistened (unprocessed). The appearance of the surface is smoother than the surface shown in FIG. 2.

As described above, the water content of the kraft paper closely resembles that of the laminate paper subjected to wetting treatment in FIG. 1 and the laminate paper subjected to wetting treatment in FIG. 2. However, there is a clear difference between them with respect to the rates of increase in thickness due to swelling after being immersed in insulating oil (to swell the polypropylene layer) and dried and the rate of increase in thickness of the laminate paper as measured at the time when swelling reaches equilibrium. When the increase in thickness of the laminated paper subjected to wetting treatment in FIG. 2 is very small as compared with that of the laminate paper in FIG. 3 which is not processed. However, the rate of increase in thickness of the laminate paper subjected to wetting treatment in FIG. 1 is even small compared with the laminate paper subjected to wetting treatment in FIG. 2 (refer to Example 1 and Comparative Examples 1 and 2).

The processed paper shown in FIG. 1 is kraft paper moistened by water drops from a nozzle. Since water drops having a wide particle size distribution are applied at random to the kraft paper, the degree of local swelling caused by the water drops on the surface of kraft paper becomes quite different from one another due to the differences in the size of the water drops, and irregular unevenness is formed on the surface of kraft paper after it is dried. The laminate paper subjected to wetting treatment in FIG. 2 is kraft paper moistened by equilibrating with steam. Since water is uniformly applied by steam to the kraft paper from the beginning the difference in the degree of local swelling becomes small due to the homogeneous presence of water on the surface of the kraft paper and, consequently, formation of unevenness after drying becomes poor. The effect of reducing the rate of increase in thickness due to swelling of the polypropylene film after impregnation of the laminate paper subjected to wetting treatment shown in FIG. 2 with insulating oil is only compensated by a function of uniformly increasing or decreasing the thickness when merely wetting-drying the kraft paper. However, with respect to the laminate paper subjected to wetting treatment shown in FIG. 1, not only the function of compensating by variation in the thickness of kraft paper but also unevenness formed on the surface of kraft paper has the same effect as if the laminate paper is previously subjected to mechanical embossment processing. Accordingly, an increase in thickness due to swelling of the polypropylene layer in the insulating oil is absorbed by deformation of unevenness.

The method for applying water drops having a wide particle size distribution in the present invention may be carried out by using a nozzle or by scattering water drops by jetting water from a nozzle and hitting the water against a wire netting or by spraying water by means of a sprayer. The width of the particle size distribution of the water drops can be varied by controlling the diameter of the nozzle or water pressure. However, it is preferred to hit a water stream jetting from a nozzle against a wire netting, as described above, because the width of particle size of water drops formed ranges from about 10 μm to about 5,000 μm, and preferably 20 to 500 μm.

It is preferred that moistening of the surface of the laminate paper is carried out such that the water content is 6 to 12%. Though the effect is observed in a range of 3 to 6%, the degree of improvement is small. On the other hand, the effect is not improved much when the water content is more than 25%. The application of too much water causes deterioration of the mechanical strength of the laminate paper and, consequently, there is the possibility of deteriorating the winding operation on the conductors.

The laminate paper to which the present invention is applied may be a paper prepared by bonding insulating papers composed of natural cellulose such as kraft papers, etc. to each other by extruding thereon a polyolefin resin as an adhesive by means of an extruder or a paper which is prepared by bonding a polyolefin film to a natural cellulose paper in a body with heating and pressing. The fiber papers used in the present invention may papers composed of 100% natural cellulose or papers made by blending natural cellulose with synthetic fibers or synthetic pulps.

Suitable examples of the plastics and fiber papers which can be used for preparing an electrically insulating laminate paper of the present invention include those described in U.S. Pat. No. 3,775,549. Particularly preferred are plastic films which are dissolved in an amount of 5% by weight or less, preferably 3% by weight or less after immersing in DDB at 100° C. for 7 days, and papers having a density of 0.50 to 0.85 g/cm$^3$, and preferably 0.60 to 0.80 g/cm$^3$ and a thickness of 20 to 200 μm and preferably 30 to 100 μm.

In the following, the present invention is illustrated in greater detail with reference to examples. However, the present invention is not limited to these examples. Measurements of the degree of swelling of laminate papers in the Examples and Comparative Examples is carried out using an apparatus capable of directly reading a variation in thickness of the laminate paper immersed in insulating oil while a prescribed pressure (pressure of 1 to 15 kg/cm$^2$) is applied to samples by means of a spring pressure. The method and apparatus are described in "Materials in a Society for the Study of Insulating Materials in the Learned Electric Society", No. EIM-75-51 (presented on Dec. 9, 1975).

EXAMPLE 1

A stream of small water drops having a diameter of 20 to 500 μm were formed by hitting ion-exchanged water having an electric conductivity of less than 5 μΩ/cm against a 300 mesh wire netting under a water pressure of 0.51 kg/cm$^2$ through a nozzle of 1.0 mmφ. The drops were applied to both sides of a polypropylene laminate paper having a thickness of 125 μm which was prepared by bonding kraft insulating papers (thickness: 43 μm) to both sides of a polypropylene film (thickness: 55 μm) to produce a sample having a water content of 11.2%. After the sample was allowed to stand in a room at a relative humidity of 65% for 24 hours, it was set to a tester for measuring the degree of swelling when 10 sheets of the sample were piled up. When the thickness under a pressure of 1 kg/cm$^2$ was measured, it was 1206 μm. It was dried in a state of setting to the tester at a temperature of higher than 100° C. for 24 hours to sufficiently remove water, and thereafter it was impregnated with insulating oil (hard type alkylbenzene) at 100° C. so as to result in an equilibrium state. When the thickness of the polypropylene laminate paper was measured, it was 1197 μm. The increasing rate of thickness was −0.75%.

COMPARATIVE EXAMPLE 1

A polypropylene laminate paper which was not processed by a stream of small drops in Example 1 was similarly impregnated with oil. When the increasing rate of thickness was determined, it was +1.14%.

COMPARATIVE EXAMPLE 2

A polypropylene laminate paper was moistened with steam by being allowed to stand in a conditioning box at a relative humidity of 90% instead of applying a stream of small water drops in Example 1 to obtain a sample having a water content of 10.5%. When the increasing rate of thickness after impregnating the sample with oil by the same manner was determined, it was 0.0%.

EXAMPLE 2

A stream of small water drops was applied to a polypropylene laminate paper under the same condition as in Example b 1, except that the whole thickness of the laminate paper was 170 μm wherein a polypropylene film having a thickness of 105 μm was used instead of the polypropylene film having a thickness of 55 μm in the polypropylene laminate paper in Example 1. As a result, the water content was 11.9%. When the increasing rate of thickness after impregnating the sample with oil was determined, it was −0.72%.

COMPARATIVE EXAMPLE 3

When the increasing rate of thickness of the polypropylene laminate paper which was not processed with a stream of small water drops as in Example 2 was determined, it was +1.84%.

COMPARATIVE EXAMPLE 4

When the laminate paper was allowed to stand in a conditioning box at a relative humidity of 90% instead of applying a stream of small water drops as in Example 2, the water content was 10.4%. The increasing rate of thickness of the sample after being impregnated with oil was +1.09%.

EXAMPLE 3

The processing was carried out under the same conditions as in Example 1, except that a polypropylene laminate paper having a whole thickness of 155 μm composed of a polypropylene film having a thickness of 68 μm instead of that having 55 μm, an insulating paper having a thickness of 43 μm and an insulating paper having a thickness of 70 μm was used. The water content of the sample after application of a stream of small water drops was 10.7%. The increasing rate of thickness after impregnated with oil was −1.60%.

COMPARATIVE EXAMPLE 5

A polypropylene laminate paper which was not processed with a stream of small water drops in Example 3 was impregnated with oil. When the increasing rate of thickness was determined, it was +1.26%.

COMPARATIVE EXAMPLE 6

When a polypropylene laminate paper was allowed to stand in a conditioning box at a relative humidity of 90% instead of applying a stream of small water drops in Example 3, the water content became 10.5%. The increasing rate of thickness after impregnating the sample with oil was −0.75%.

EXAMPLE 4

A sample having a water content of 11.5% was produced by applying a stream of small water drops in the same manner as in Example 3, except that a laminate paper having the whole thickness of 220 μm composed of a polypropylene film having a thickness of 134 μm instead of a polypropylene film having a thickness of 68 μm in Example 3 was used. When the increasing rate of thickness of this sample (after being impregnated with oil) was determined, it was −0.68%.

COMPARATIVE EXAMPLE 7

A polypropylene laminate paper which was not processed with a stream of small drops in Example 4 was impregnated with oil. When the increasing rate of thickness was determined, it was +2.30%.

In the above described examples, polypropylene laminate papers were illustrated. However, the plastic film is not of course limited to the polypropylene film, and other laminate papers composed of polyethylene or polybutene, etc. may be similarly used.

As described above, an electrically insulating laminate paper comprising an integrated assembly composed of fiber papers and a plastic film bonded to each other is prepared by forming irregular unevenness on the fiber papers. This is done by scattering water drops having a width of particle size distribution of 10 to 1000 μm and moistening to uniformly swell the whole fiber papers. This method has a substantial effect on preventing an increase in thickness of the electrically insulating laminate paper because of cancellation, due to the latitude of the fiber paper, of the increase in thickness caused by swelling of the plastic film layer in insulating oil. Accordingly, it is possible to remarkably improve techniques for production of an electric apparatus such as OF type electric cables or OF type electric condensers, by utilizing the electrically insulating laminate paper. Further, the development of electrically insulating laminate paper having better properties has become possible by increasing the ratio of the plastic film in the electrically insulating laminate paper.

While the invention has been described in detail and with reference to specific embodiment thereof, it will be apparent to one skilled in the art that various changes and modifications can be made therein without departing from the spirit and scope thereof.

What is claimed is:

1. An electrically insulating laminate paper for an electric apparatus to be wound in a wet state on a conductive material followed by drying and thereafter impregnated with insulating oil comprising an integrated assembly composed of a plastic film layer, and a fiber paper layer treated by having water drops with a wide particle size distribution of 10 to 1000 μm scattered on the surface thereof, wherein said fiber paper is moistened so as to result in a water content of 5 to 25 weight % and the surface of said fiber paper is pockmarked all over to form irregular unevenness.

2. An electrically insulating laminate paper for oil-impregnated electric apparatus according to claim 1, wherein said plastic film is polypropylene film and said fiber papers are kraft papers.

* * * * *

UNITED STATES PATENT AND TRADEMARK OFFICE
CERTIFICATE OF CORRECTION

PATENT NO. : 4,571,357
DATED : February 18, 1986
INVENTOR(S) : Ryosuke HATA et al It is certified that error appears in the above-identified patent and that said Letters Patent is hereby corrected as shown below:

[73] Assignee: Sumitomo Electric Industries, Ltd.,
Tokyo, Japan
& Tomoegawa Paper Company, Ltd.

Signed and Sealed this

Fifth Day of August 1986

[SEAL]

Attest:

DONALD J. QUIGG

Attesting Officer

Commissioner of Patents and Trademarks